April 14, 1964    E. C. HANNA    3,128,874
INERTIA CONVEYOR
Filed July 3, 1961    2 Sheets-Sheet 1

INVENTOR
EDWARD C. HANNA
BY
ATTORNEYS

April 14, 1964   E. C. HANNA   3,128,874
INERTIA CONVEYOR
Filed July 3, 1961   2 Sheets-Sheet 2
FIG. 3
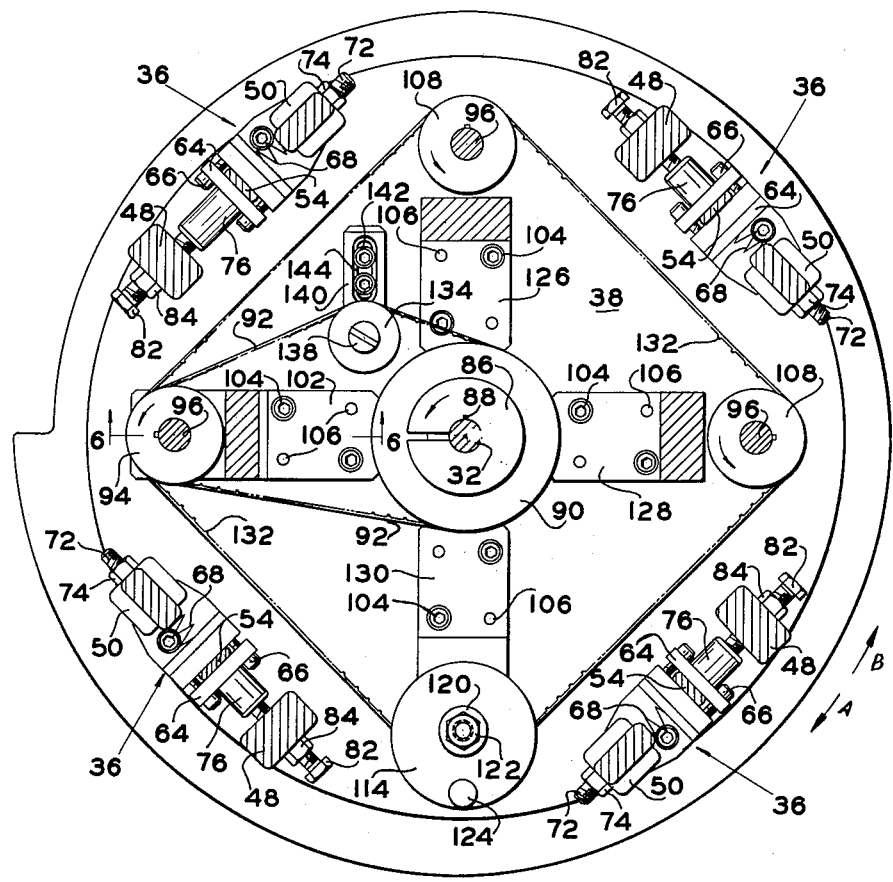
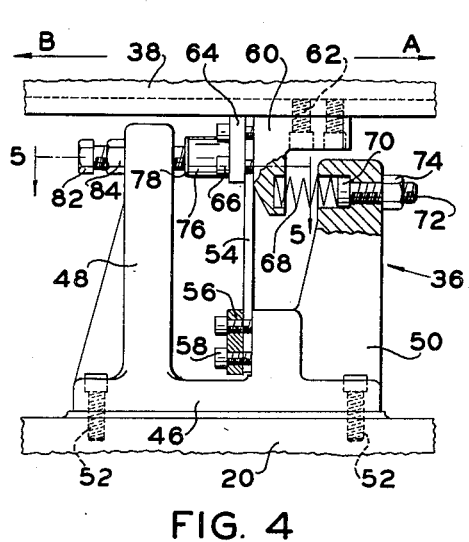
FIG. 4
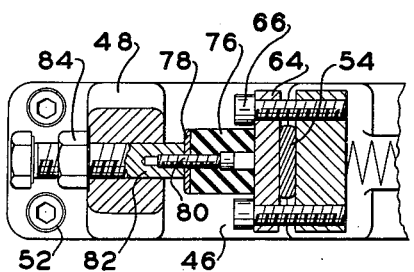
FIG. 5
INVENTOR
EDWARD C. HANNA
BY
ATTORNEYS United States Patent Office 3,128,874
Patented Apr. 14, 1964

3,128,874
INERTIA CONVEYOR
Edward C. Hanna, Waynesboro, Pa., assignor to Landis Machine Company, Waynesboro, Pa., a corporation of Pennsylvania
Filed July 3, 1961, Ser. No. 121,739
6 Claims. (Cl. 198—220)

The present invention relates to spiral conveyors and more specifically to an improved conveyor mechanism for imparting an inertial force to units of solid material to cause them to move along a spiral path from a lower to a higher elevation.

The spiral conveyors presently in use are given a vibratory movement either by electromagnetic means or by a system of rotating eccentric weights. In both cases the vibration is three-dimensional, i.e. the movement of the conveyor has a substantial vertical component. Thus, if the helical conveyor is adapted, for example, for handling small bodies such as screw blanks or the like, each of the bodies being conveyed leaves its supporting surface during the downward movement of the conveyor. While the body is thus momentarily suspended in mid-air, the horizontal component of the motion of the conveyor causes the position previously occupied by the body to move laterally relative thereto and therefore the body falls again to its supporting surface at a different location. Continuous repetition of this action transports the body in the predetermined direction.

It has been noted that, under such conditions, the moving body is out of contact with the conveyor surface during a considerable proportion of the total time spent on the conveyor. This fact, plus the disorientation and random displacement resulting from the unnecessary movements of a number of bodies being thrown into the air simultaneously, causes a substantial loss of efficiency in the conveyor.

In addition, the vertical vibration has a number of other disadvantages and undesirable features. It increases wear on any moving parts, requires that the structural parts be made very heavy to prevent their failure and is transmitted to the building floor and surrounding structures. In the past, elaborate and expensive additions to the basic conveyor have been provided in an effort to contain this vibration.

It has been found to be possible to increase the efficiency of such a conveyor to an important degree and to obviate the above disadvantages by utilizing a novel drive and support system which eliminates the vertical component of the vibratory motion. In accordance with the present invention a novel system of rotating eccentric weights and springs is employed to create an inertial force that alternates in direction and is confined substantially to the horizontal plane.

In accordance with the present invention the bodies to be moved are carried along in the direction that the member supporting them is moved, when that member is moved slowly. On the othr hand, when the supporting member is moved rapidly, inertia prevents the free body from moving. Consequently, if the supporting member is oscillated slowly in one direction and rapidly in the opposite direction, the free body will move intermittently but steadily in said one direction. In practice the frequency of the oscillation is made quite high so that the intermittent nature of the movement of the free body is hardly apparent.

In prior conveyors, the vertical component of the vibratory motion is generated by supporting the conveyor on springs that are inclined with respect to the conveyor axis. In the present invention the spiral conveyor is supported upon spring members that are disposed substantially parallel to the conveyor axis. These springs create, in part, the speed differential between the opposite directions of oscillation. The differential is augmented by other, tangentially directed springs and drive forces acting upon the conveyor in one direction only.

Accordingly, it is an object of the present invention to provide novel spiral vibratory conveyors that operate with horizontal oscillation only.

Another object is to provide novel vibratory conveyors having substantially no vibration in the vertical direction and consequently operating with improved efficiency and a minimum deleterious effect upon themselves and their supporting structure.

A further object of the invention is to provide novel conveyors of the above description in which the operative inertial force is generated by a system of rotating eccentric weights.

A still further object is to provide novel conveyors which are supported upon substantially vertical leaf springs and which are rotated in one direction at a given speed and then in the opposite direction at a higher speed, by the cooperative action of the rotating weights, the vertical springs and additional, tangentially directed springs and drive forces.

It is an additional object of the invention to provide novel vibratory conveyors which are driven by an electric motor which is mounted on a stationary base coaxially of the conveyor whereby the motor is not subjected to high speed vibratory forces.

Further objects and advantages of the invention will be apparent from the following description and the accompanying drawings which show an exemplary embodiment of the invention as applied to a reservoir-feeder for small metal parts. In the drawings:

FIGURE 3 is a horizontal section taken substantially along line 3—3 of FIGURE 2;

FIGURE 4 is a partial side elevation of the mechanism as seen from the line 4—4 of FIGURE 2;

FIGURE 5 is a fragmentary section taken substantially along line 5—5 of FIGURE 4.

Figure 1:
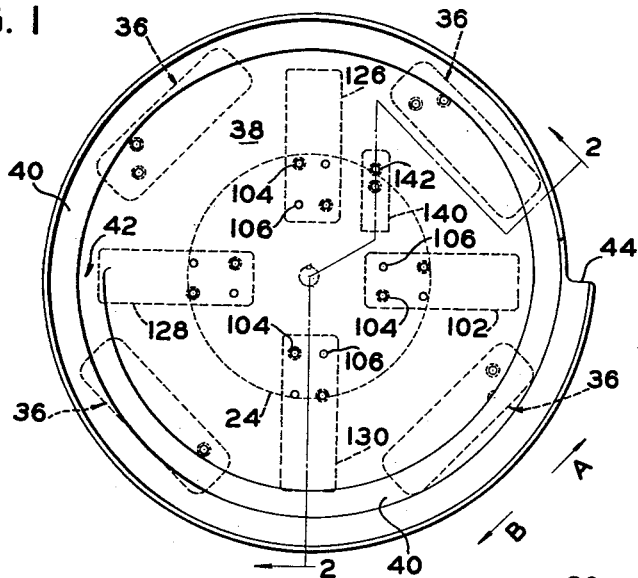
FIGURE 1 is a top plan view of the conveyor of the present invention.

The exemplary mechanism shown in the drawings comprises a stationary base 20 having a central opening 22 in which is disposed an electric motor 24. A plate 26 is secured across the top of opening 22 by screws 28 and is employed to support the flange-type motor 24 to which it is attached by screws 30. The drive shaft 32 of the motor projects vertically upward through the central opening 34 in the plate 26.

Four support units, indicated generally at 36 (FIGURES 2, 3 and 4), are mounted on the base 20 and constitute a support for a substantially circular reservoir 38 having on its periphery a circular ramp 40, beginning at a point 42 on the bottom of the reservoir 38 and winding counterclockwise to the top thereof at 44.

Each unit 36 comprises a bracket 46 having two upstanding arms 48 and 50 and being secured to the base 20 by means of screws 52. A leaf spring 54, directed vertically when unstressed, is confined closely to one side of the arm 50 by means of a clamping member 56. Screws 58 pass on both sides of the spring 54 to attach the clamping member 56 to the bracket arm 50.

A bracket 60 is secured to the plane bottom surface of the reservoir 38 by means of screws 62. The leaf spring 54 is attached to the bracket 60 in the same manner as described above, that is, a clamp-member 64 holds the spring 54 against the bracket 60 and is secured to the bracket by screws 66 which pass on both sides of the spring. Thus the reservoir and its contents are supported entirely upon the four leaf springs 54.

Springs 54 and the reservoir 38 are biased toward the left as seen in FIGURE 4, i.e. clockwise when viewed from the top of the reservoir as in FIGURE 1, by four compression springs 68. As best shown in FIGURE 4, each spring 68 is seated in suitable opposed sockets in the bracket 60 and the bracket arm 50 respectively. A plug 70 is provided in the socket in the bracket arm 50 and a screw 72 is threaded through the arm to adjust the compressive force of the spring. On the opposite or outer side of the arm 50, a nut 74 is mounted on the screw 72 to lock it in adjusted position.

The force of the spring 68 is resisted by a resilient bumper 76, of rubber or similar material as well as by the spring 54. The bumper 76 may be supported to prevent deformation, by a washer 78 and the bumper 76 and washer 78 are secured by a screw 80 to the end of a larger screw 82. The screw 82 is threaded into the top of the bracket arm 48 and is provided with a nut 84 to lock the screw 82 in adjusted position. Further purposes of this structure will be explained in the description of the operation of the mechanism to follow.

Figure 2:
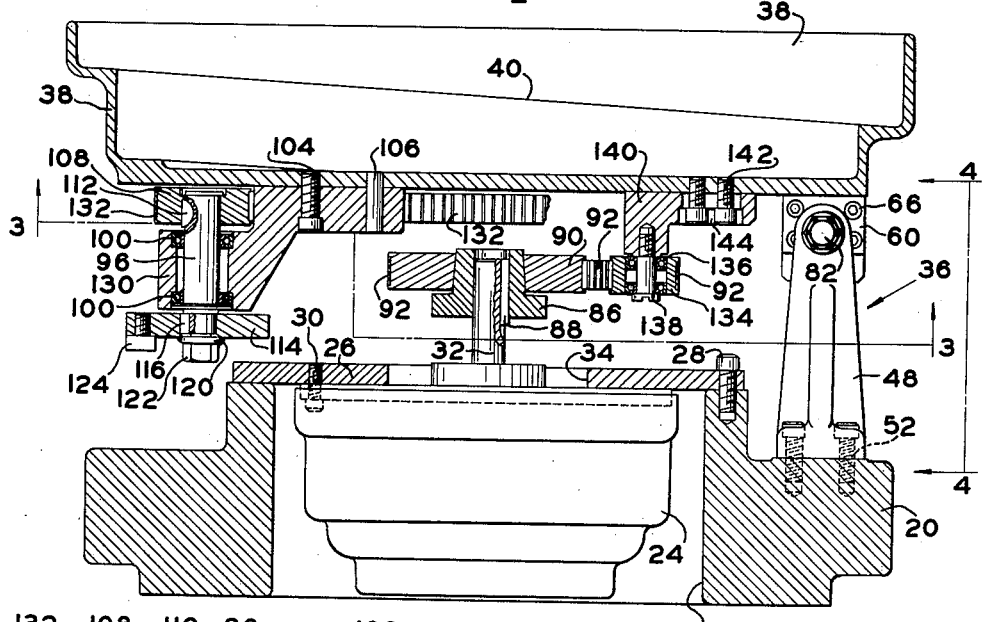
FIGURE 2 is a side view of the mechanism, partially in section, taken along line 2—2 of FIGURE 1 and with certain details omitted for clarity.
Figure 6:
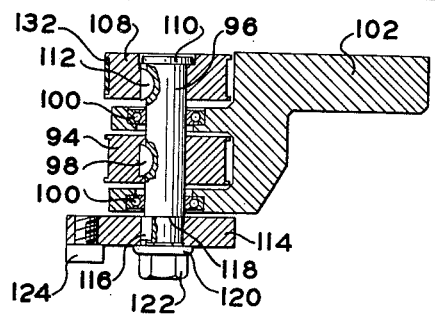
FIGURE 6 is a fragmentary section taken along line 6—6 of FIGURE 3.

Referring now particularly to FIGURES 2 and 3, a hub 86 is mounted on the upper end of the motor shaft 32 and is constrained to rotate therewith by a key 88. The hub 86 represents one conventional means of mounting a pulley 90 for rotation with the shaft 32. The pulley 90 is a so-called timing-belt pulley and a timing belt 92, i.e. a belt having transverse teeth on the interior surface for engaging similar teeth on the pulley, connects the pulley 90 with a like, but smaller, pulley 94 (FIGURE 6). The pulley 94 drives the shaft 96, upon which it is mounted, by means of a key 98.

The shaft 96 is journalled in bearings 100 in a bracket 102 which is secured to the underside of the reservoir by screws 104 and locating pins 106 (FIGURE 3). The shaft 96 supports a second timing-belt pulley 108 closely adjacent the bottom surface of the reservoir 38. The pulley 108 is retained axially on the shaft 96 by an enlarged head 110 and is driven from the shaft by a key 112. On the opposite or lower end of the shaft 96, an eccentric disc 114 is mounted. A key 116 is provided to drive the disc 114 with the shaft 96. The disc 114 is held in proper axial position on the shaft and out of contact with the bracket 102 between a small shoulder 118 on the shaft and a washer 120 and nut 122 threaded upon the extremity of the shaft. The imbalance produced by the eccentricity of disc 114 may if desired, be accentuated by screwing a suitable weight 124 to the disc near the periphery thereof.

Three additional brackets 126, 128 and 130 (FIGURE 3) are spaced around the underside of the reservoir 38 at 90° intervals from the bracket 102 and from each other. These three brackets are identical and are secured to the reservoir by screws 104 and locating pins 106. These brackets 126, 128 and 130 are similar to the bracket 102 except that they do not support pulleys 94. Each of the brackets 126, 128 and 130 has a vertical bore containing anti-friction bearings 100 in which is journalled a shaft 96. A pulley 108 is mounted on the upper end of each shaft 96 and is identical to and axially aligned with the pulley 108 on the bracket 102.

As before, each shaft 96 is driven from the pulley 108 by a key 112 and a head portion 110 of the shaft 96 retains the pulley 108 on the shaft. An eccentric disc 114 with plug 124 is keyed on the lower end of each shaft 96 by a key 116 and is retained thereon by a washer 120 and nut 122. All of the four pulleys 108 are connected and driven by a timing belt 132 (FIGURES 2 and 3) and all of the four weighted eccentric discs 114 are mounted in phase relation. For example, in FIGURE 3 one of the discs is shown with the weight plug 124 radially outward with respect to the center of the reservoir 38. For proper operation of the device, therefore, all of the discs 114 must be mounted with the heavy side and the weight plug radially outward. The discs are, of course, constantly maintained in this phase relation by the timing belt 132.

The timing belt 90, connecting the pulleys 90 and 94, may be kept taut by an idler pulley 134. This pulley, as shown in FIGURES 2 and 3, is journalled upon anti-friction bearings 136 on a stud 138. The stud 138 is threadedly engaged in a bracket 140 which is attached to the underside of the reservoir 38 by screws 142. An elongated slot 144 is provided in the bracket 142 for the accommodation of screws 144 so that the position of the bracket may be adjusted to alter the tension on the belt 92. This structure is not a necessary part of the invention but is convenient because of the difficulty of precisely correlating the lengths of belts 92 and 132.

The device is operated by starting the motor 24 rotating the shaft 32 and driving the pulley 90 in a counterclockwise direction indicated by the arrow in FIGURE 3. The pulley 90 drives the pulley 94 in the same direction through the belt 92. The pulley 94, through the key 98, rotates the shaft 96 upon which it is mounted and this rotation is transmitted to the pulley 108 on the same shaft through the key 112. Through the timing belt 132 this first pulley 108 drives all the other pulleys 108 continuously in the same direction of rotation and in exact synchronism with each other.

Since all of the shafts are thus rotated in the same direction, all of the weighted discs 114 are also driven synchronously in the same direction by the keys 116. When all of the weights 124 of the discs are rotated to a position 270° from the position shown in FIGURE 3, the centrifugal force generated by the weights acts upon the centers of shaft 96 in the clockwise direction as seen in that figure. The reservoir 38 being resiliently mounted, reacts to this inertial force by rotating a short distance in the clockwise direction.

This motion of the reservoir 38, being also in the direction of the arrow A of FIGURE 4, is in the proper direction to bend the leaf spring 54 from its unstressed vertical position toward the arm 50 and to compress the helical spring 68. As a consequence of its operation against the force of both springs 54 and 68, the rotation of the reservoir 38 in this direction is relatively slow.

When the weighted discs 114 have rotated to a position 90° from the starting point shown in FIGURE 3, the centrifugal force acts upon the centers of the shafts 96 in the counterclockwise direction as seen in FIGURE 3. Consequently, the reservoir 38 rotates in the counterclockwise direction.

This motion of the reservoir 38, being also in the direction of the arrow B of FIGURE 4, is augmented by the released restoring force of both springs 54 and 68 and all of these forces restore the reservoir 38 to its original position relatively rapidly. In this return movement the resilient member 76 serves as a bumper to stop the movement of the reservoir and to dampen extraneous vibration. The screw 72 can be used to adjust the operating length of the spring 68 and therefore to tune its frequency to that of the rotation of the disc 114.

Another factor tending to slow the motion in the direction A and speed the motion in the direction B is the fact that in the example shown, the pulley 90 is approximately twice as large as the driven pulley 94. Consequently, the motor torque creates a component force tending to rotate the axis of the shaft 96 carrying pulley 94 in a counterclockwise direction, as seen in FIGURE 3, about the center of the driving pulley 90, thus augmenting the speed of rotation of the reservoir in the direction B.

It will be seen therefore, that the reservoir rotates alternatley slowly in the direction A and rapidly in the direction B, the slow rotation (see FIGURE 1) carrying the free bodies counterclockwise up the spiral ramp 40 and the rapid opposite rotation leaving the free bodies in the advanced position previously attained. In practice, this alternation is caused to occur on the order of 60 cycles per second, resulting in a vibratory action of the reservoir and a steady progression of the free bodies up the ramp 40.

It will be noted that the reservoir oscillates about the axis of the shaft of the motor 24 which is rigidly supported in the stationary base. Accordingly, the motor is not subjected to the high frequency vibrating forces as is the case in prior constructions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An inertia feeder comprising a stand, a generally circular reservoir having an inclined ramp, a plurality of springs carried by said stand supporting said reservoir for limited rotary movement about its axis, additional springs interposed between said stand and said reservoir and yieldably opposing motion of said reservoir in one direction about its axis, a plurality of weights carried by said reservoir, and means for moving said weights in synchronism to impart a series of oppositely directed drive impulses to said reservoir, the drive impulses in one direction being opposed by said additional springs and the drive impulses in the opposite direction being augmented by said additional springs whereby the rotary velocity of said reservoir in said one direction is less than the rotary velocity of said reservoir in the opposite direction.

2. An inertia feeder comprising a stand, a generally circular reservoir having an inclined ramp, a plurality of generally vertically extending leaf springs carried by said stand and supporting said reservoir for limited rotary movement about its axis, additional springs interposed between said stand and said reservoir and directed tangentially thereof to yieldably oppose motion of said reservoir in one direction about its axis, a plurality of weights rotatably carried by said reservoir, and drive means for moving said weights in synchronism to impart a series of oppositely directed drive impulses to said reservoir, the drive impulses in one direction being opposed by said additional springs and the drive impulses in the opposite direction being augmented by said additional springs whereby the rotary velocity of said reservoir in said one direction is less than the rotary velocity of said reservoir in the opposite direction.

3. The combination according to claim 2 wherein said drive means includes a motor rigid with said stand and positioned co-axially of said reservoir, and means drivingly connecting said motor to said weights.

4. An inertia feeder comprising a stand, a generally circular reservoir having an inclined ramp, a plurality of essentially vertical springs connected at one end to said stand, said springs being connected at their upper ends to said reservoir for supporting said reservoir for limited rotary movement about an essentially vertical axis, additional springs interposed between said stand and said reservoir and extending tangentially of said reservoir and yieldably opposing motion of said reservoir in one direction about its axis, and means for imparting an oppositely directed rotary drive impulses to said reservoir, the drive impulses in one direction being opposed by said additional springs and the drive impulses in the opposite direction being augmented by said additional springs whereby the rotary velocity of said reservoir in said one direction is less than the rotary velocity of said reservoir in the opposite direction to thereby cause articles positioned on said ramp to move in said opposite direction.

5. The combination according to claim 4 wherein said drive means includes a plurality of weights rotatably carried by said reservoir, a motor rigid with said stand and positioned coaxially of said reservoir and means drivingly connecting said motor to said weights.

6. An inertia feeder comprising a fixed stand, a generally circular reservoir having an inclined ramp, a plurality of leaf springs rigidly connected to said stand and to said reservoir to support said reservoir for oscillation about its axis, said springs extending vertically when relaxed, said springs comprising the sole support for said reservoir, means for imparting a series of oppositely directed rotary drive impulses to said reservoir to deflect said vertically extending leaf springs and to cause said reservoir to oscillate about its axis, said oscillations being confined by said support springs to a plane normal to the axis of said reservoir, additional springs interposed between said stand and said reservoir and directed tangentially thereof to yieldably oppose motion of said reservoir in one direction about its axis whereby the rotary velocity of said reservoir in said one direction is less than the rotary velocity of said reservoir in the said opposite direction.

References Cited in the file of this patent

UNITED STATES PATENTS

| | | |
|---|---|---|
| 2,296,293 | Naeher | Sept. 22, 1942 |
| 2,333,338 | Rapp | Nov. 2, 1943 |

FOREIGN PATENTS

| | | |
|---|---|---|
| 148,844 | Great Britain | July 10, 1920 |
| 1,154,959 | France | Apr. 18, 1958 |